United States Patent [19]

Yamamoto et al.

[11] Patent Number: 4,593,722
[45] Date of Patent: Jun. 10, 1986

[54] SEALANT FOR INTERNALLY SEALING PIPELINE

[75] Inventors: Mitsuo Yamamoto; Namio Kinumoto; Toshinori Tsuji, all of Osaka; Tutomu Hiraoka, Uji, all of Japan

[73] Assignee: Osaka Gas Company, Osaka, Japan

[21] Appl. No.: 676,619

[22] Filed: Dec. 4, 1984

Related U.S. Application Data

[63] Continuation of Ser. No. 559,843, Dec. 9, 1983, abandoned, which is a continuation of Ser. No. 416,730, Sep. 10, 1982, abandoned, which is a continuation-in-part of Ser. No. 304,439, Sep. 21, 1981, abandoned.

[51] Int. Cl.$^4$ ................................ F16L 9/14
[52] U.S. Cl. .................................. 138/145; 406/193
[58] Field of Search ....................... 138/145; 406/193

[56] References Cited

U.S. PATENT DOCUMENTS

| | | | |
|---|---|---|---|
| 3,069,375 | 12/1962 | Bullitt | 524/493 |
| 3,249,463 | 5/1966 | Carlee | 524/493 |
| 3,455,241 | 7/1969 | Perkins | 524/493 |
| 3,907,581 | 9/1975 | Willcox | 524/497 |
| 3,940,358 | 2/1976 | Bernett | 260/29.6 |
| 4,104,229 | 8/1978 | Sekmakas | 260/29.6 |
| 4,249,953 | 2/1981 | Keifer | 524/432 |
| 4,283,320 | 8/1981 | Carroll | 524/497 |
| 4,319,610 | 3/1982 | Eckner | 138/145 |
| 4,421,569 | 12/1983 | Dichter | 138/145 |

OTHER PUBLICATIONS

Chemical Engineering, Jun. 11, 1962, p. 207.

*Primary Examiner*—Paul R. Michl
*Attorney, Agent, or Firm*—Edwin E. Greigg

[57] ABSTRACT

A liquid sealant of the aqueous emulsion type to be delivered in foamed state into a pipeline requiring leakage repair and/or prevention. A large part of this sealant is drained from the pipeline, and the part of the sealant remaining on inner walls of the pipeline is allowed to cure. The sealant contains coagulations of weakly cohering fine particles of inorganic oxide at less than 5 percent, and the particles have diameters not exceeding 0.05$\mu$.

3 Claims, 17 Drawing Figures

4,593,722

SEALANT FOR INTERNALLY SEALING PIPELINE

This application is a continuation of Ser. No. 559,843 filed Dec. 9, 1983, now abandoned, which is a continuation of Ser. No. 416,730 filed Sept. 10, 1982, now abandoned, which is a continuation in part of application Ser. No. 304,439 filed Sept. 21, 1981, now abandoned.

BACKGROUND OF THE INVENTION

1. Field of the Invention

This invention relates to a sealant for sealing fine cracks and cavities in a pipeline for distributing gas, water or the like and at the same time internally coating the pipeline.

2. Description of the Prior Art

A method of sealing fine cracks and cavities in a pipeline and at the same time internally coating the pipeline with a foamed sealant is already known and is used when leakage has occurred or is likely to occur in pipelines, particularly those for distributing gas. The known method comprises the steps of supplying and filling a pipeline with a foamed sealant of the aqueous emulsion type whereby the sealant penetrates the leaking point, passing air through the pipeline to discharge an excess amount of the sealant, the rest of the sealant remaining adhered to the interior wall of the pipeline, and finally allowing the residual sealant to cure.

This method is far more efficient than the old method of replacing a leaking pipeline portion or filling the pipeline with a sealant in liquid state. However, it is required today to shorten the time for repair work.

SUMMARY OF THE INVENTION

This invention intends to meet the above-mentioned requirement.

Therefore, an object of the invention is to provide a sealant for internally coating a pipeline which achieves a drastic shortening of the time necessary for filling and sealing fine cracks and cavities in the interior wall of the pipeline.

Another object of the invention is to provide a liquid sealant of the aqueous emulsion type curable at high rate.

A further object of the invention is to provide a sealant having for the principal ingredient a polymer, preferably an acrylic polymer, which is emulsified and suspended, and for the auxiliary ingredient fine particles of inorganic oxide weakly adhering to one another into aggregations. These aggregated fine particles will, by nature, readily break up under shear and easily enter the fine cracks and cavities in the interior wall of the pipeline. Therefore, the sealant according to this invention is capable of plugging the fine cracks and cavities more completely and quickly than a sealant containing no such fine particles of inorganic oxide. Preferably the sealant has an inorganic oxide content less than 5 percent by weight and inorganic oxide particles of not more than 0.05$\mu$ diameter.

The liquid sealant used in this invention may be an ordinary aqueous emulsion type, but its solids content is preferably about 50-65 percent by weight particularly when it is desired to form a tubular inner coating. Such a sealant is curable at a rate about twice the curing rate of a sealant readily available on the market which has a solids content of about 40 percent, and almost equal to the curing rate of a solution type sealant. This is illustrated in FIG. 1 showing the relationship between the sealant film thickness T (micron) and the curing time S (second), in which a denotes the emulsion type sealant having a solids content of 60 percent which is used in this invention, and b denotes the emulsion type liquid sealant having a solids content of 40 percent which is available on the market. However, this invention is of course not limited to the above range, and the solids content should be adjusted to suit temperature, humidity and other conditions.

The principal ingredient may be selected from polymers of ethylene, styrene-butadiene, acrylonitrile-butadiene, methyl methacrylate-butadiene, vinylpyridiene, vinyl chloride, vinyl acetate, vinylidene chloride, etc. or from cis 1,4-polyisoprene, polyurethane, polybutene, and polyacrylate.

Apart from increasing the solids content, part of the water in which the solids are emulsified and suspended may be replaced by a volatile solvent such as methanol in order to increase the curing rate of the emulsion type liquid sealant.

According to the invention the liquid sealant per se is curable at high rate as described above. The curing of the sealant adhering in tubular form to the interior wall of the pipeline may be further accelerated by introducing hot air into the pipeline. The hot air heats not only the inner surface of the residual sealant but also its body and outer surface by virtue of heat conduction to positively cause the solvent to evaporate. It is possible in practising the invention to make efficient use of the heat and at the same time avoid sliding or splashing of the residual sealant by passing the hot air at a relatively slow flow rate. Thus, the invention has shortened the curing time to a satisfactory degree while providing a coating of uniform thickness to realize a reliable repair or prevention of leakage.

It is desirable that the hot air is passed through the pipeline at a temperature of 60°–80° C. A temperature above this range may create cracks in the residual sealant, and a temperature therebelow may not warrant the desired shortening of time.

The sealant best suited to this invention has for the principal ingredient a polymer, particularly an acrylic polymer, as described, and for the auxiliary ingredient inorganic oxide at less than 5 percent by weight. The inorganic oxide in form of particles having diameters not exceeding 0.05$\mu$ and weakly adhering to one another into aggregations may preferably be selected from a group consisting of silica, alumina, silica-alumina, zeolite, titanium oxide, zinc oxide, and magnesium oxide. The polymer content may be at 40 percent by weight or more to achieve the desired object and will produce a still better result at 50–65 percent by weight, as described.

The invention will now be described in greater detail with reference to the drawings showing preferred embodiments.

DETAILED DESCRIPTION OF THE PREFERRED EMBODIMENT

Figure 1:
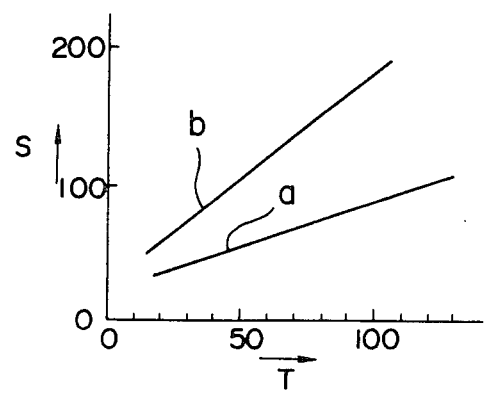
FIG. 1 is a graph showing the relationship between the sealant film thickness and the curing time.
Figure 2:
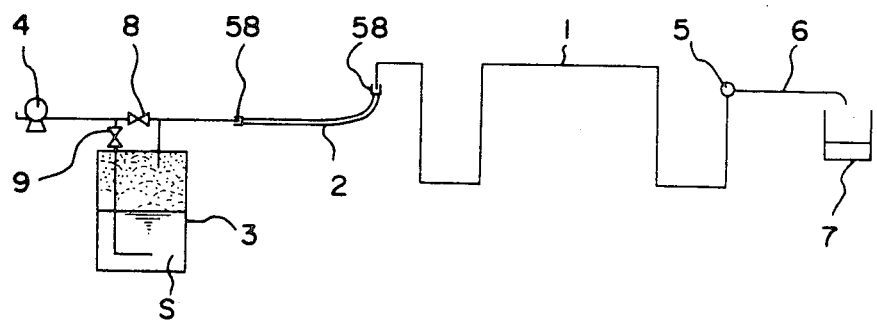
FIG. 2 is a diagram showing a piping system for applying interior coating by using the sealant according to the invention.

FIG. 2 shows an example of coating treatment carried out using the described emulsion type liquid sealant curable at high rate. A foaming device 3 is connected to one end of a pipeline 1 through a connecting tube or pipe 2 and a blower 4 is connected to the foaming device 3. A hose 6 connected to a cock 5 at the other end of the pipeline 1 extends to a recovery vessel 7.

The liquid sealant S stored in the foaming device 3 comprises an emulsion of an acrylic polymer dispersed in water with a solids content of about 60 percent.

First, the blower 4 is operated with a valve 8 closed and valve 9 open, to foam up the liquid sealant S in the foaming device 3 and feed the foamed sealant into the pipeline 1 by way of the connecting tube 2. The blower 4 is stopped upon arival of the sealant at the recovery vessel 7, and the pipeline 1 is now filled with the foamed sealant. After a time the blower 4 is operated with the valve 8 open and the valve 9 closed, to discharge an excess amount of the sealant from the pipeline 1 to be collected at the vessel 7. The sealant remaining in the pipeline 1 assumes a tubular form as at S' extending axially of the pipeline 1 and adhering to the interior wall thereof as shown in FIG. 3C.

Next, the blower 4 is stopped to allow the residual sealant S' to cure spontaneously.

The blower 4 may be kept running to accelerate the curing, and that still further by blowing dry air into the pipeline. Conversely, the pipeline may be closed and then evacuated by a vacuum pump or other means to decrease the vapor pressure thereby accelerating the curing.

Figure 3A:
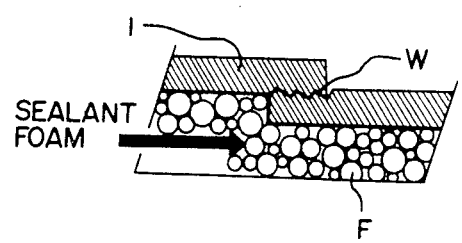
FIGS. 3A, 3B and 3C are sectional diagrams schematically showing progress of the interior coating treatment.
Figure 3B:
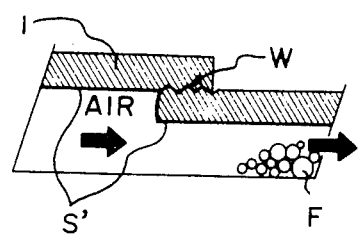
Figure 3C:
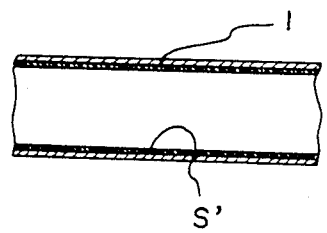

Referring to FIGS. 3A, 3B and 3C illustrating the progress of the above treatment, when the foamed sealant F fills the pipeline (FIG. 3A) is also penetrates the interstice between thread joints W. The sealant remains in the thread joints W and on the interior wall of the pipeline as an excess sealant is removed by air delivered into the pipeline (FIG. 3B). Thus, fine cracks and cavities in both a straight portion (FIG. 3C) and the joint portion are plugged after the sealant cures.

The sealant containing inorganic oxide as described has proved effective to plug the fine cracks and cavities with greater assurance, as described hereinafter.

The specific constructions and functions of the devices used for carrying out the foregoing treatment are now described with reference to FIGS. 4–7.

Figure 4:
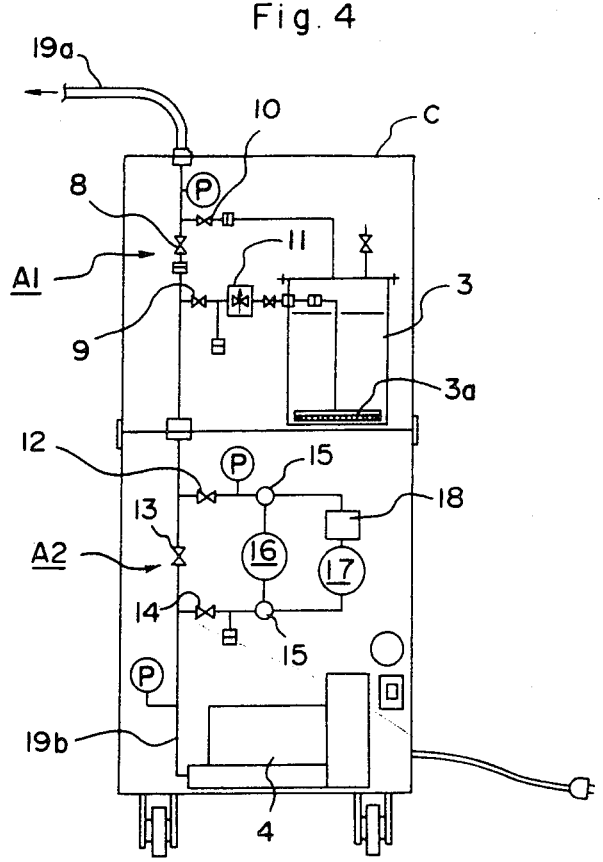
FIG. 4 is a schematic front elevation of a device for foaming up a sealant and feeding it to a pipe interior.

FIG. 4 shows the foaming device 3, the blower 4 and piping A1 and A2 all housed in a boxlike casing C as a unit. The foaming device 3 and the blower 4 may be arranged side by side instead of the illustrated vertical arrangement. The piping A1 includes a valve 10, a constant flow regulator 11 and a bubbling tube 3a in addition to the described valves 8 and 9. The piping A2 includes a valve 12, three-way valves 15, a reducing valve 16 for measuring flow resistance, a reducing valve 17 for testing airtightness, and a leak tester 18. The reducing valves 15, 16 and the leak tester 18 are dispensable. A feed pipe 19b extending from the blower 4 is connected to a feed pipe 19a for delivering the foamed sealant, and may also branch off outside the casing C.

Figure 5:
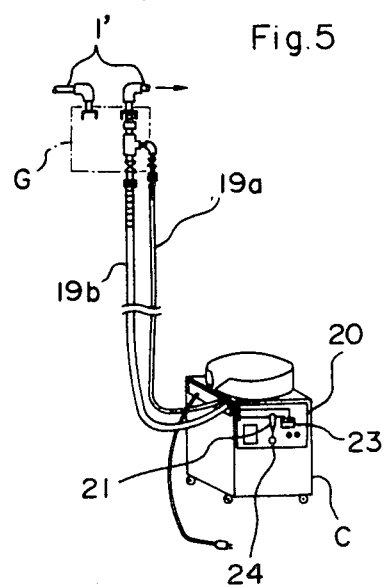
FIG. 5 is a perspective view of the device of FIG. 4.

To facilitate the operation a graphic panel 20 may be attached to an outside face of the casing C, and a lever 21 may be provided to project from the panel 20 and between a figure 23 showing the foaming device and a figure 24 showing the blower as shown in FIG. 5, the lever 21 being shiftable between a position to feed the foamed sealant into the pipeline and a position to drain the excess sealant therefrom. FIG. 5 also shows an example of connecting the piping 19a and 19b in which a flowmeter G (dot and dash line) has been removed from a household service pipe 1' and the piping 19a and 19b are connected to the opening end of the downstream pipe portion.

Figure 6:
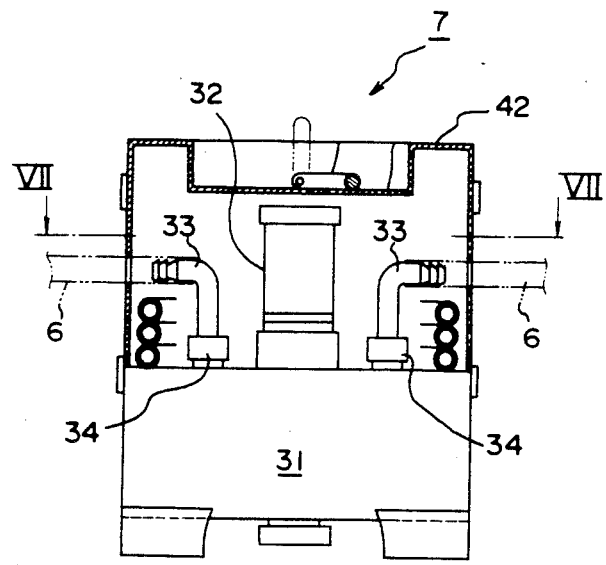
FIG. 6 is a schematic elevation of a recovery vessel for collecting discharged sealant.
Figure 7:
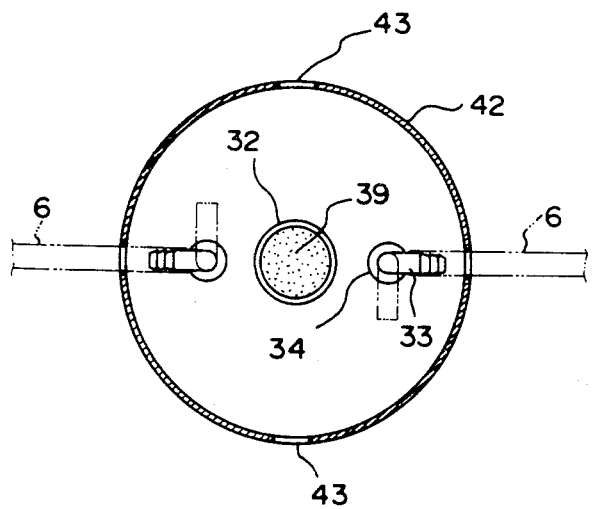
FIG. 7 is a section taken on line VII—VII of FIG. 6.

The recovery vessel 7 shown in FIGS. 6 and 7 comprises a receptacle 31, hose coupling pipes 33 attached to the receptacle 31 and having check valves 34 respectively, and a gas-liquid separator 32 upstanding on the receptacle 31 and inside a covering case 42. The foamed sealant is delivered to the receptacle 31 from the hoses 6 connected respectively to the downstream ends of pipelines 1 under treatment (FIG. 2), and passes through a deodorant packed in the separator 32 where the foams are broken and the resulting air is deodorised and discharges through outlet pores defined in the covering case 42. The liquid resulting from the broken foams drips to the receptacle 31. The recovered liquid sealant can be used repeatedly so long as it retains required properties. Accordingly there is no likelihood at all of environmental pollution caused by the excess sealant drained from the pipeline 1.

Another example of coating treatment is hereinafter described which uses the devices shown in FIGS. 8–10. The high rate curable sealant is first foamed up in the unit shown in FIG. 4 and is fed into the pipeline 1, an excess amount of the sealant being discharged into the recovery vessel of FIG. 6 as in the preceding embodiment. Thereafter hot air is introduced to the pipe interior by action of the blower 4 at a temperature of 60°–80° C. The supply of hot air may be continued until the sealant adhering in tubular form to the interior wall of the pipeline cures almost completely or may be discontinued when the sealant is half cured.

Figure 8:
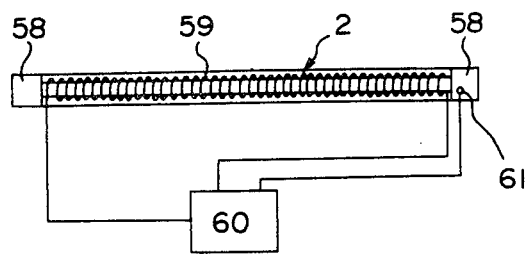
FIG. 8 is a schematic view of an air heating unit used in the coating treatment.

FIG. 8 shows one type of air heating means which comprises an electric heater 59 of nichrome wire or the like mounted in the connecting tube 2 between the foamed sealant feed means and the pipeline 1 (FIG. 2), the heater 59 extending between two end joints 58. The heater 59 is connected to a power supply box 60 containing a current regulator. The joint 58 at the downstream end of the heater has a thermostat 61 connected to the power supply box 60.

Figure 9:
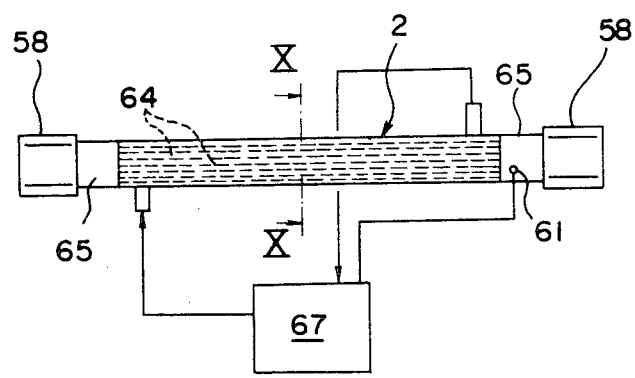
FIG. 9 is a schematic view of another type of air heating unit.
Figure 10:
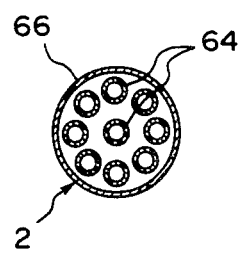
FIG. 10 is a section taken on line X—X of FIG. 9, FIGS. 11 and 12 are views each illustrating a testing method.

Instead of the electric type, the air heating means may be the heat medium circulation type, for example, as shown in FIGS. 9 and 10. This heating means comprises a plurality of parallel tubes 64 and collecting and distributing headers 65 coupled to the connecting tube 2. The plurality of tubes 64 through which the sealant and air flow are surrounded by an outer tube 66 through which a heat medium such as hot water or hot air is circulated by a circulation pump 67.

The heating means may be other types than those described above and may be disposed at a position other than the connecting tube 2.

Thus the air advancing from the blower 4 towards the pipeline 1 is heated to a suitable temperature to cause the sealant adhering in tubular form to the interior wall of the pipeline to cure quickly, whereby the total treatment time is drastically shortened.

PERFORMANCE TESTS AND OBSERVATIONS

Following are test data on sealant samples I-V comprising emulsion E1, silica (inorganic oxide) E2, carbon black (organic compound) E3 and water, each ingredient having the undermentioned composition, mixed at respective parts by weight specified in Table 1.

E1 Emulsion
  Main Component: acrylic polymer
  Solids Content: 40 wt %
  Specific Gravity: 1.03
  Viscosity: about 20 cp
  PH: 7.5–8.5
  Diameter of emulsified particles: not exceeding $0.05\mu$
E2 Silica
  Main Component: $SiO_2$ 99.8% or more
  Apparent Density: 50 g/lit.
  Particles Diameter: about 12 m$\mu$
E3 Carbon Black
  Main Component: C
  Particles Diameter: not exceeding $0.05\mu$

TABLE 1

|  | E1 | E2 | E3 | $H_2O$ |
|---|---|---|---|---|
| Sample I | 60 | — | — | 40 |
| Sample II | 60 | 1 | — | 39 |
| Sample III | 60 | 2 | — | 38 |
| Sample IV | 60 | — | 1 | 39 |
| Sample V | 60 | — | 5 | 35 |
| (parts by weight) | | | | |

TEST 1

Figure 11:
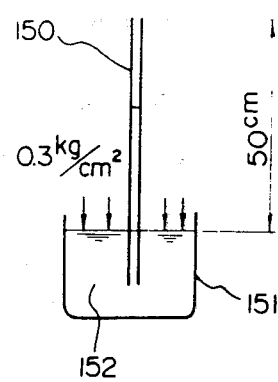

As shown in FIG. 11, a glass capillary 150 opening at both ends is held upright with the lower end immersed in a sealant sample 152 in a vessel 151 and the upper end at a height of 50 cm from the sample surface, and a pressure of 0.3 kg/cm² G is applied to the sample surface. Sealing performance of samples I-V has been judged by observing the height from the sample surface to which the samples rise through the capillary 150. The test has been carried out using capillaries having inside diameters of $50\mu\phi$, $100\mu\phi$, $200\mu\phi$ and $300\mu\phi$, and the results are shown in Table 2.

TABLE 2

| Inside Diameters of Capillary | Samples | | | | |
|---|---|---|---|---|---|
| | I | II | III | IV | V |
| 50 $\mu\phi$ | Rose about | Rose 10 cm | Rose 6 cm | Rose 30 cm | Rose 20 cm |
| 100 $\mu\phi$ | Blew out in several minutes | Rose 15 cm | Rose 10 cm | Blew out in about 10 minutes | Blew out in about 30 minutes |
| 200 $\mu\phi$ | Blew out instantly | Rose 30 cm | Rose 13 cm | Blew out instantly | Blew out instantly |
| 300 $\mu\phi$ | Blew out instantly | Rose 34 cm | Rose 20 cm | Blew out instantly | Blew out instantly |

TEST 2

Figure 12:
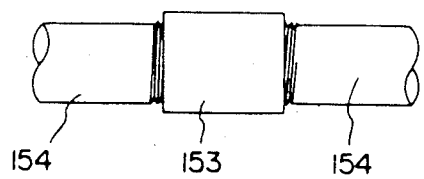

As shown in FIG. 12, steel gas pipes 154 having a diameter of 1 inch are screwed to a socket 153 having the same diameter in a leaking condition. Each of the samples I-V is filled in this piping and is withdrawn therefrom after applying a pressure of 0.3 kg/cm² G for five minutes. Air leakage is tested immediately thereafter by applying an air pressure of 0.3 kg/cm²G to the piping interior for ten minutes, and then leaking amounts are measured under a pressure of about 300 mm $H_2O$ which corresponds to the actual distributing pressure. The amount of leaking air in the absence of the coating treatment is about 50 c.c./min. The test results are shown in Table 3.

TABLE 3

| | Samples | | | | |
|---|---|---|---|---|---|
| | I | II | III | IV | V |
| Leaking conditions | Leak Occurred in about 1 minute | No leak after lapse of about 10 minutes | No leak after lapse of about 10 minutes | Leak occurred in about 2 minutes | Leak occurred in about 10 minutes |
| Leaking amounts | 36 c.c/min. | — | — | 32 c.c/min. | 28 c.c/min. |

It has been found through the above tests 1 and 2 that samples II and III, i.e. the sealants comprising the emulsion and silica (inorganic oxide), are superior to the others in providing seals in short time, being applicable to wide ranges of cavity sizes and resisting pressure.

Figure 13:
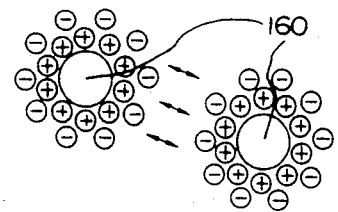
FIG. 13 is a schematic view showing electrification of emulsified particles.

Explanation is given hereinafter of the theoretical (inferential) basis for improving the sealing quality of the sealant by mixing coagulations of weakly cohering fine particles of inorganic oxide such as alumina, silica-alumina or the like dispersedly in the sealant whose main component is emulsion or latex. As shown in FIG. 13, each polymer particle 160 in the sealant is positively charged by a surrounding cations forming layer which is surrounded by a layer of anions in water thereby constituting an electrical double layer. The electrical repellancy among the anions results in repellancy among the polymer particles 160 and maintains the latter in suspension.

Figure 14:
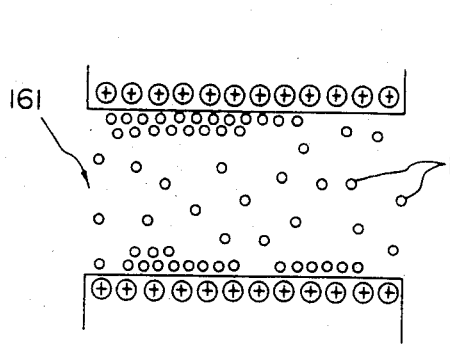
FIG. 14 is a schematic view showing a principle of polymer particle precipitation according to a known method.
Figure 15:
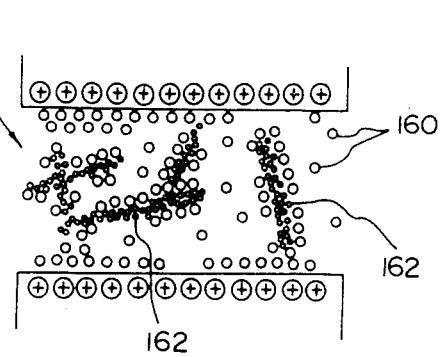
FIG. 15 is a schematic view showing a principle of polymer particle precipitation where inorganic oxide is mixed in dispersed state.

In conventional sealing methods, as shown in FIG. 14, the sealant in the above state is filled in a cavity 161 to be sealed and then electrical neutralization occurs between cations such as metallic ions present in inner peripheral walls of the cavity 161 and anions around the polymer particles 160 disposed adjacent the inner peripheral walls to break the electrical double layers of the polymer particles 160 thereby creating positively charged polymer particles. The positively charged polymer particles come into cohesion with the other polymer particles surrounded by the electrical double layers through electrical neutralization therebetween, whereby the polymer particles precipitate. At the same time external stress such as shearing stress is applied to the sealant in the cavity 161 to increase the chances of contact between the positively charged polymer particles and the polymer particles surrounded by the electrical double layers and promote their cohesion and precipitation.

However, since cations necessary for creating the positively charged polymer particles are present only in the inner peripheral walls of the cavity 161, the polymer precipitation progresses only from the inner wall surfaces and therefore it takes a relatively long time for precipitated polymer to grow to the center of the cavity 161. This is the reason for the relatively long time required before the cavity 161 is completely sealed as understood from comparison among the sealants in the foregoing Test 1, Table 2, the column for capillary inside diameter $50\mu\phi$. In the case of the cavity 161 having a relatively large diameter, the shearing stress acting on the sealant in the cavity 161 and the amount of cations present in the inner walls of the cavity 161 are small relative to the amount of the sealant, which retards polymer precipitation, the polymer particles 160 near the center of the cavity 161 just being driven out of the cavity 161. As seen from Table 2, it is practically impossible to completely seal cavities having a diameter of $100\mu\phi$ or more.

As opposed to the above, the fine particles of inorganic oxide used in the present invention have, by nature, positively charged parts and negatively charged parts in intermingled state. These fine particles weakly cohere and form coagulations by electrical attaction between the positively charged parts and the negatively charged parts, which coagulations include plenty of positively charged parts which do ont participate in the particle cohesion. By mixing the coagulated inorganic oxide dispersedly in the sealant, precipitated polymer grows around the coagulations 162, as shown in FIG. 162, by electrical neutralization between the positively charged parts of the coagulations 162 and anions constituting the electrical double layers surrounding the polymer particles 160, as does from the inner walls of the cavity 161. Therefore, the present invention provides complete sealing in a considerably short time compared with the above-noted conventional method. The sealant according to the invention also is effective in completely sealing a large diameter cavity 161 since, although the external stress and the amount of the cations in the inner walls of the cavity 161 are small relative to the amount of sealant in the cavity 161 as already described, the coagulations 162 of inorganic oxide in an amount proportional to the amount of sealant in the cavity 161 positively hold the polymer particles 160 and cause their precipitation.

According to the above theoretical basis, like effect may be produced by mixing dispersedly in the sealant whose main component is emulsion or latex, coagulations of weakly cohering fine particles of inorganic oxide other than silica used in the foregoing tests, such as alumina, silica-alumina, zeolite, titanium dioxide, zinc oxide, magnesium oxide, and preferably silica having silanol groups in its molecule or other compounds that apt to link with each other by hydrogen bonds.

We claim:

1. A process for sealing cavities in a pipeline which comprises forming a sealant comprising acrylic polymer particles in an emulsified and dispersed state and coagulations of weakly cohering fine particles of inorganic oxide selected from a group consisting of silica, silica-alumina and zeolite, with said inorganic oxide being contained at less than 5 percent by weight and said fine particles of inorganic oxide having diameters of about 12 millimicrons, directing said sealant into said pipeline, filling the pipeline with said sealant in a foamed state of an aqueous emulsion type, delivering air under pressure into the pipeline to drain an excess amount of the sealant from the pipeline and wherein said coagulations of inorganic oxide readily break into finer particles upon entry into said small cavities, said finer particles accumulating in said small cavities and promoting precipitation of the acrylic polymer particles thereby to effectively seal said small cavities.

2. A method as claimed in claim 1, wherein hot air at a temperature of about 30°–100° C. is utilized to cure the residual sealant.

3. A method as claimed in claim 2, wherein the hot air is in a temperature range of about 60°–80° C.

* * * * *